Oct. 21, 1930.  V. T. MALCOLM  1,778,765
VALVE
Filed Feb. 3, 1928
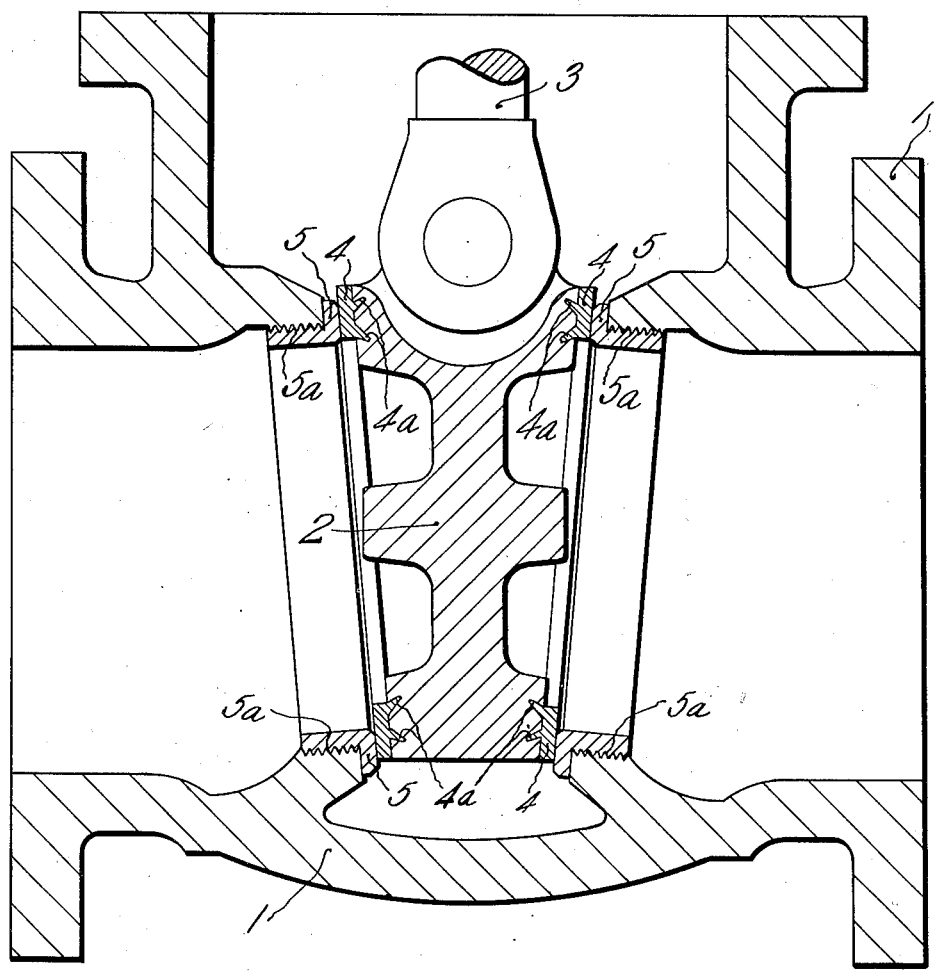
INVENTOR.
Vincent T. Malcolm
BY Chapin & Neal
ATTORNEYS.

Patented Oct. 21, 1930

1,778,765

UNITED STATES PATENT OFFICE

VINCENT T. MALCOLM, OF INDIAN ORCHARD, MASSACHUSETTS, ASSIGNOR TO CHAPMAN VALVE MANUFACTURING COMPANY, OF INDIAN ORCHARD, MASSACHUSETTS, A CORPORATION OF MASSACHUSETTS

VALVE

Application filed February 3, 1928. Serial No. 251,717.

This invention relates to improvements in valves for use in pipe lines which conduct water, oil, gas, steam, etc. and has for its object the improved manufacture of the sealing contact between the gate and its seat of such valves so as to improve their service and durability.

In the manufacture of valves, great difficulty has heretofore been encountered in obtaining a suitable construction for disc faces, plug faces and seat rings, particularly in the matter of proper physical characteristics of the metal capable of withstanding high temperatures and of resisting corrosion, erosion and other destructive actions. The feature of being non-corrosive is found in bronze or nickel bronze seats but such material is both too soft for use at high pressures or for high velocity fluids and gases and its coefficient of expansion is not suited for great changes of temperature. Various alloys of nickel and copper have likewise been used for this purpose but I have discovered that a material far superior to any of those heretofore employed in this connection is a nitrified alloy of steel known as "nitralloy." The term nitralloy is the general name given to certain alloy steels which can be surface hardened by subjecting the steel to the action of ammonia gas while the steel is heated, a process known as nitriding; and the alloy steel thus treated is also sometimes called nitrided steel. The composition of such an alloy is fully described in U. S. Letters Patent to Adolf Fry No. 1,649,398, dated Nov. 15, 1927, and the method of nitrifying the same is described in Patent No. 1,487,554, to the same inventor, dated March 18, 1924.

Nitrified nitralloy is similar to a case hardened steel in that it has an extremely hard surface and a tough core but it has further characteristics which make it peculiarly suited for use in seat rings, plug and disc face rings of gate valves, namely, it does not change its physical properties of hardness or toughness when subjected to high temperatures (700° to 900° F.) and the two meeting surfaces of this material for sealing the valve, i. e., the plug face ring and the seat ring will work upon one another at a high and continued pressure of contact without galling or seizing. By such an application of this material, it becomes possible to produce satisfactory valves for super-heated steam at extremely high temperatures, the use of which has heretofore been limited in part by the deficiencies of prior valve structures.

The present invention consists therefore, of a valve having both its seat ring and gate face ring of nitrified nitralloy, affixed rigidly to their respective foundations of ordinary cast or forged steel as an integral part thereof. Further advantages of the invention will become apparent from the following more detailed description taken in connection with the accompanying drawing.

Referring to said drawing:—

The figure is a sectional view of a gate valve which may be regarded as typical of those to which this invention may be applied. In this view, the upper part of the bonnet and operating member has been omitted.

In the drawing, 1 indicates the valve body, 2 is the gate which in the form shown is of the wedge type, and sometimes referred to as the plug. These parts may be of the ordinary cast or forged steel generally used for such purposes and having fixed thereto the rings of nitrided steel in the manner hereinafter described. 3 is the operating spindle connected to the plug and which, it will be understood, is raised and lowered by a hand wheel (not shown) for operating the plug in opening and closing the valve. When the valve is closed, the plug 2 is in its lower position as shown.

It will be understood that the face of plug 2 is round or disc like for closing the round opening in the body 1. The actual sealing contact for the valve is constituted by the abutting surfaces of the plug face ring 4 and the seat ring 5. A similar sealing contact may be provided on both sides of the plug 2 when designed for pressure at both sides of the valve.

The plug face ring 4 and seat ring 5 are both made of the same material, viz, nitralloy. Inasmuch as such material is too hard on the surface when nitrified to be machined or fitted, it must be affixed to its foundation prior to the nitrifying process. In my method of application, the respective rings are forged from nitralloy, and then machined to shape. The plug face ring 4, while in its malleable state, is rolled into the receiving recess of the plug so that the spreading prongs 4ª securely lock it in place.

The seating ring 5, before being screw threaded into place on the body 1, is nitrified to give it surface hardness and in this nitrifying process the threaded portion 5ª of the ring is luted or protected with clay so as to be unaffected by the nitrifying action. The contact surface of seat ring 5 of course acquires glass like hardening during the process.

After the plug ring 4 has been rolled into place, it in turn is nitrified or hardened and in this process also the adjacent portions of the plug are luted or protected with clay so as not to be subjected to the hardening process, thus allowing the contact surface of said ring 4 to likewise acquire the glass-like hardness of nitrified nitralloy. After the foregoing operations are completed, the contact surfaces of the rings 4 and 5 may be finished smooth by a polishing operation and the parts are ready for use. Any grinding or machine operation on the plug ring should preferably be performed before the nitriding or hardening process.

It will be found that a valve made in this way will have an unusual degree of durability, will not corrode or rust, and the seat ring surfaces will not be destroyed by erosion of either gases or fluids. They are particularly resistant to hydrogen sulphide and high temperature oil, and therefore such valves find an advantageous use in oil wells, oil drilling apparatus and refineries.

What I claim is:

1. A valve having its sealing contact constituted by abutting surfaces made of nitrided steel.

2. A valve having a face ring and seat ring for sealing contact, the abutting surfaces of said rings being constituted by nitrided steel.

3. A gate valve comprising a gate and body, a face ring affixed to the gate by an interlocking engagement and a seat ring affixed to the body by an interlocking engagement, said rings being both made of nitralloy, the interlocking portions of said rings being unnitrified and the abutting surfaces of said rings being nitrified.

4. A gate valve comprising a gate and body, a face ring affixed to the gate by an interlocking engagement and a seat ring affixed to the body by an interlocking engagement, said rings being both made of nitralloy, the abutting contact surfaces of said rings being nitrified and ground to a smooth surface for effecting a tight closure.

In testimony whereof I have affixed my signature.

VINCENT T. MALCOLM.